United States Patent
Kurtz et al.

(10) Patent No.: US 7,448,254 B2
(45) Date of Patent: Nov. 11, 2008

(54) METHOD AND APPARATUS FOR MEASURING KNOCKING IN INTERNAL COMBUSTION ENGINES

(75) Inventors: Anthony D. Kurtz, Saddle River, NJ (US); Joseph Van DeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 192 days.

(21) Appl. No.: 11/353,418

(22) Filed: Feb. 14, 2006

(65) Prior Publication Data

US 2007/0186620 A1 Aug. 16, 2007

(51) Int. Cl.
*G01L 23/22* (2006.01)

(52) U.S. Cl. ..................................... 73/35.13
(58) Field of Classification Search ................ 73/35.12, 73/35.13
See application file for complete search history.

(56) References Cited

U.S. PATENT DOCUMENTS

| | | | | |
|---|---|---|---|---|
| 3,792,696 A | * | 2/1974 | Hollins | 123/198 DB |
| 4,239,871 A | * | 12/1980 | Fukui | 526/73 |
| 4,329,871 A | * | 5/1982 | Grossner et al. | 73/35.03 |
| 4,491,010 A | * | 1/1985 | Brandt et al. | 73/35.05 |
| 4,821,194 A | * | 4/1989 | Kawamura | 701/111 |
| 4,976,241 A | * | 12/1990 | Ishida et al. | 123/406.37 |
| 5,181,417 A | * | 1/1993 | Nishida et al. | 73/115 |
| 5,278,760 A | * | 1/1994 | Ribbens et al. | 701/111 |
| 5,955,771 A | * | 9/1999 | Kurtz et al. | 257/419 |
| 6,210,989 B1 | * | 4/2001 | Kurtz et al. | 438/51 |
| 6,293,154 B1 | * | 9/2001 | Kurtz | 73/727 |
| 6,301,957 B1 | * | 10/2001 | Sakaguchi et al. | 73/117.3 |
| 2002/0050162 A1 | * | 5/2002 | Castagne et al. | 73/35.12 |
| 2005/0166665 A1 | * | 8/2005 | Honda | 73/35.12 |
| 2006/0090544 A1 | * | 5/2006 | Yorita et al. | 73/35.12 |

* cited by examiner

*Primary Examiner*—Robert R Raevis
(74) *Attorney, Agent, or Firm*—The Plevy Law Firm

(57) ABSTRACT

A method and apparatus for measuring knocking in internal combustion engines employs a high temperature transducer, which transducer is mounted within a cylinder. The output of the transducer is solely related to pressure. The output signal from the transducer is directed to the input of a high frequency amplifier associated with a band pass filter. In this manner the combustion signal can be filtered out and one provides a signal which is only indicative of the knocking signal and of the knocking frequencies. This signal can be analyzed simply and effectively by the use of a processor such as a multimeter or a microprocessor. In a similar manner the processor can compare the combustion and knocking signal without the band pass filtering with the knocking signal with the combustion signal filtered out.

14 Claims, 2 Drawing Sheets

METHOD AND APPARATUS FOR MEASURING KNOCKING IN INTERNAL COMBUSTION ENGINES

FIELD OF THE INVENTION

This invention relates to pressure sensors employed in internal combustion engines and more particularly to a pressure sensor apparatus and method for measuring knocking in an internal combustion engine.

BACKGROUND OF THE INVENTION

Internal combustion engines are well known and include gasoline piston engines which are used in automobiles, outboard engines for motorboats, lawn mowers and other equipment as well as diesel engines used in trucks, tractors and similar equipment. The aircraft piston engine is fundamentally the same as that used on automobiles but is engineered for lightweight application and is usually air cooled. Common characteristic features of commercially successful internal combustion engines include the compression of air, raising of air temperature by the combustion of fuel in the air at its elevated temperature, extraction of work from the heated air by expansion to the initial pressure, and exhaust. A common phenomena in combustion engines is referred to as the "knocking" phenomena. This knocking phenomena in internal combustion engines is associated with pressure waves. The literature is full of examples of this phenomena and reference is made to the text referred as Heywood's "Internal Combustion Engine Fundamentals" and to the specification identified as SAE960827. A technique which alleviates the aforementioned problem is highly desirable.

SUMMARY OF THE INVENTION

Apparatus for measuring knocking in an internal combustion engine, comprising: a high temperature pressure transducer positioned within the cylinder of the engine and providing an output signal indicative of a combustion signal together with a knocking signal, a filter for filtering the output signal to provide a filtered signal indicative of only the knocking signal, and a processor for processing the filtered signal to provide a measurement of the extent of the knocking.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which.

DETAILED DESCRIPTION OF PREFERRED EMBODIMENTS OF THE INVENTION

It is to be understood that the figures and descriptions of the present invention have been simplified to illustrate elements that are relevant for a clear understanding of the present invention, while eliminating, for purposes of clarity, many other elements found in typical prior art methods and systems. However, because such elements are well known in the art, and because they do not facilitate a better understanding of the present invention, a discussion of such elements is not provided herein. The disclosure herein is directed to all such variations and modifications known to those skilled in the art.

Figure 1A:
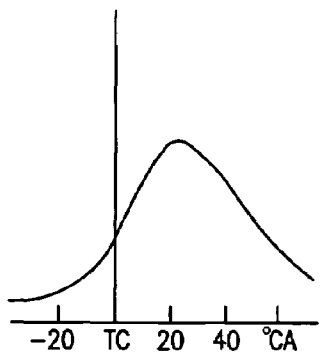
FIG. 1A depicts a normal combustion pressure signal in a combustion engine without knocking.
Figure 1B:
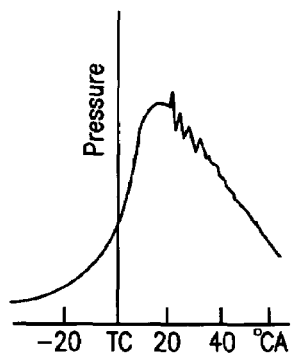
FIG. 1B depicts a combustion pressure signal with a slight knocking pressure signal.
Figure 1C:
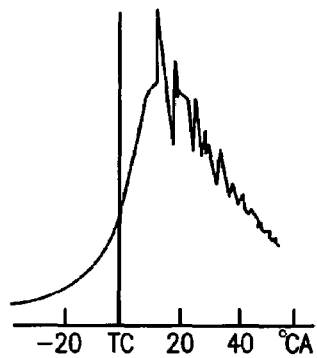
FIG. 1C depicts a combustion pressure signal with an intense knocking pressure signal.

Referring to FIGS. 1A, 1B and 1C there are shown graphs of the pressure in a normal cylinder (FIG. 1A) as compared with the pressure in cylinders with various amount of knocking (FIGS. 1B and 1C). FIG. 1A shows a normal combustion spark at 28° before top center (BTC). FIG. 1B shows a slight knock with a spark also at 28° BTC. FIG. 1C shows an intense knock with a spark at 32° BTC. The above noted figures were taken from the above noted Heywood reference and shows combustion pressures with and without knock. As one can see the y axis indicates pressure while the x axis indicates crank angle (CA). In order to measure the knocking phenomena in the prior art, an accelerometer is used on the outside of the engine. The accelerometer measures vibration of the engine. The prior art method does not directly measure the knocking pressure disturbance, but only infers it. Thus, the prior art is deficient in the sense that the pressure disturbance is not measured; rather, acceleration is measured and a pressure is deduced from the measured acceleration. In the present invention there is disclosed a method for directly measuring the in cylinder pressures associated with the knocking phenomena. Through electronic filtering one can filter out all but the knocking pressure, thereby making it easy to measure. This method gives rise to certain unanticipated advantages, such as ease of measurement, ability to analyze engine performance more accurately, and the ability to detect other engine phenomena.

Figure 2A:
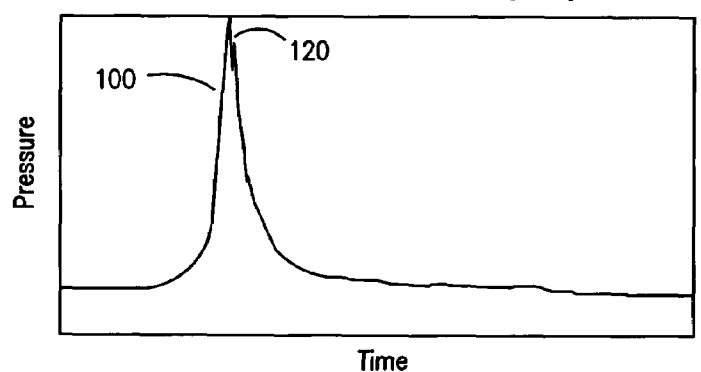
FIG. 2A shows another combustion pressure signal with a knocking pressure signal for a combustion engine.
Figure 2B:
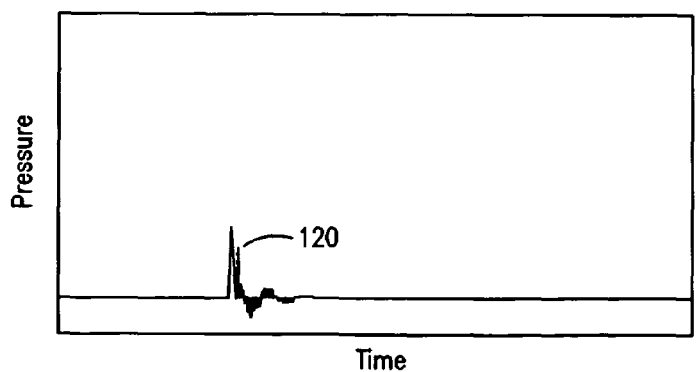
FIG. 2B depicts the knocking pressure signal with the combustion pressure signal of FIG. 2A filtered out according to the present invention; and, FIG. 3 depicts an internal combustion engine employing pressure sensing apparatus and method according to an embodiment of the present invention.

Referring to FIG. 2A there is shown a combustion output signal with a knocking signal. As one can ascertain from FIG. 2A, the pressure versus time signal is a large pulse 100 having the knocking phenomena 120 riding on top of the pulse. FIG. 2B shows the knocking signal 120 with the combustion signal filtered out. As seen in FIG. 2B the only signal that remains is the actual knocking signal, which can now be fully analyzed.

Figure 3:
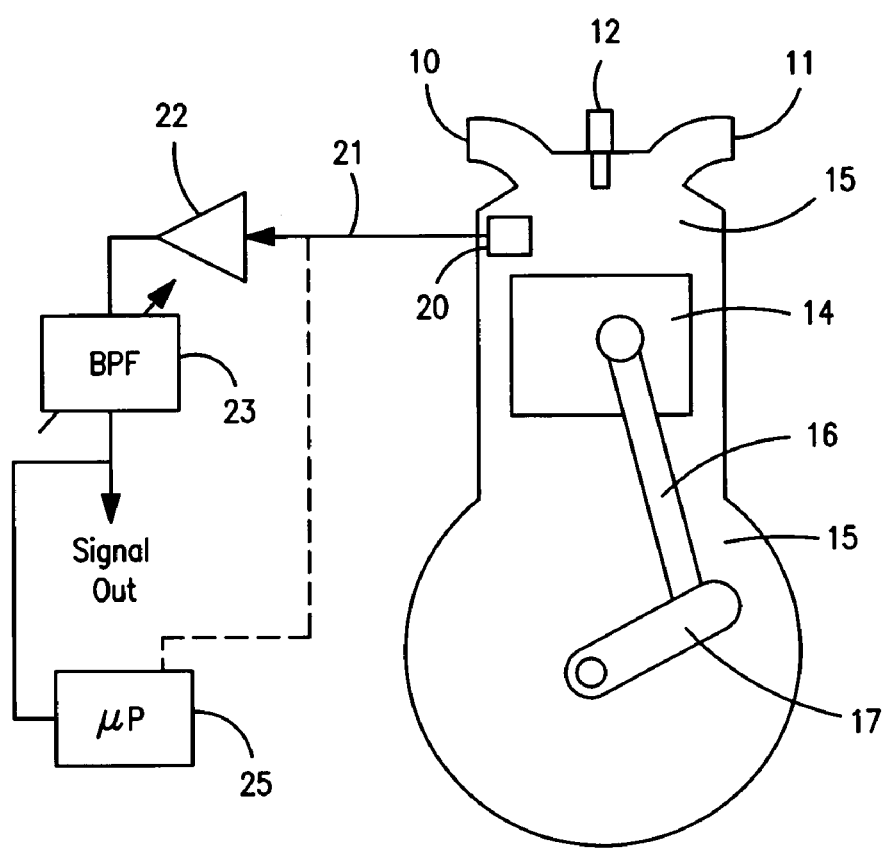

Referring to FIG. 3, there is shown an exemplary of a embodiment combustion engine and apparatus according to the present invention. The combustion engine has an intake port 10 and an exhaust port 11. Disposed between the ports or otherwise located is a spark plug 12, which operates to ignite the fuel. There is shown a piston 14 which reciprocates within a cylinder 15. The piston rod 16 is conventionally attached to a drive shaft mechanism or piston crank 17. The temperatures within the internal combustion engine cylinder 15 are extremely high. The particular engine shown in FIG. 3 is a four stroke conventional internal combustion engine. Typically, for an intake stroke the intake valve associated with the intake port is open and the piston 14 moves downward, drawing air and gasoline vapor into the cylinder 15. In the compression stroke, the intake valve is closed and the piston moves upward, compressing the mixture. On the power stroke the ignition system produces a spark via the spark plug 12 that ignites the mixture. As the mixture burns high pressure is created, which pushes the piston 14 downward. For the exhaust stroke the exhaust valve associated with the exhaust port 14 opens and the piston is moved upward, forcing the burned gases from the cylinder. The above steps are well known. In any event, as seen in FIG. 3 a high temperature pressure transducer 20 is located within the cylinder. The transducer can be inserted into an extra hole taped into the top of the cylinder head near the spark plug or can be inserted with the spark plug using a special adaptor. The pressure transducer 20 may be implemented as shown and described in U.S. Pat. No. 5,955,771 entitled *Sensors for Use in High Vibrational Applications and Methods for Fabricating the Same.* This patent issued on Sep. 21, 1999 to A. D. Kurtz et al, and is assigned to the assignee herein. A high temperature device such as a hermetically sealed sensor has a glass header defining a mounting surface for the sensor device. The glass member includes one or more pin apertures extending through the glass member from the mounting surface to the base. This allows for the output to be directed from the transducer via the output line for example 21. The sensor device includes a dielectrically isolated silicon sensor chip and a cover glass hermetically bonded and sealed to the surface of the semiconductor device which has conductive traces on it. The cover protects the semiconductor from the external environment. The chip is hermetically bonded and sealed to the mounting surface of the glass member. The semiconductor device has one or more contacts disposed on the surface for making electrical contact thereto and the cover has one or more contact apertures extending there through which exposes a portion of the contacts. The portion of each pin extending above the mounting surface is received within the contact apertures and a conductive glass frit mixture is disposed in the contact apertures and hermetically seals the contact apertures and provides electric continuity between the pins and contacts. The sensor basically has P+ sensor elements fusion bonded to a silicon oxide layer and P+ finger elements fusion bonded to the oxide layer at a relatively central area of the diaphragm. The above noted patent is incorporated in its entirety. In this manner, the pressure transducer is a dielectrically isolated piezoresistive high temperature acceleration compensated pressure transducer. U.S. Pat. No. 6,293,154 entitled *Vibration Compensated Pressure Sensing Element,* issued on Sep. 25, 2001 to A.D. Kurtz and assigned to Kulite Semiconductor Products, Inc. also depicts a pressure sensing device for producing an output proportional to applied pressure irrespective of vibration and acceleration of the device. The device includes a second glass cover which is mounted unto the opposite side of the silicon device. On the silicon device two separate identical deflecting regions are created. The cover glass allows one of the deflecting regions to be exposed to pressure while hermetically sealing the other region. Both regions are sensitive to vibration and acceleration. By electrically subtracting out the signals from these two regions it is possible to create a signal which is sensitive to pressure while subtracting out vibration and acceleration effects. This device 10 is also utilized in conjunction with transducer 20 and can be fabricated according to the teachings shown in U.S. Pat. No. 5,955,771. It is understood that many other Kulite patents depict high pressure transducers for use in ultra high temperature conditions. See, for example also, U.S. Pat. No. 6,210,989 issued on Apr. 3, 2001 to A. D. Kurtz et al and assigned to the assignee herein which also describes a high temperature structure. In any event, the structure depicted in U.S. Pat. No. 6,293,154 removes all signal components concerned with vibration or acceleration such that the output of the sensor 20 is only indicative of pressure.

Again, referring to FIG. 3, the output of the sensor 20 which is obtained via leads (21) is directed to the input of a high frequency amplifier 22. The output of the amplifier 22 which, for example, is the signal shown in FIG. 2A, is then directed to the input of the band pass filter 23. The band pass filter operates to remove the combustion signal, leaving the signal shown in FIG. 2B as the output signal. This output signal can be directed to a processor such as a microprocessor, a data acquisition system, or a simple alternating current multimeter to determine the knocking level. The signal can be processed wherein the magnitude will give a direct measure of the knocking level and more complex analysis can be performed to determine more information about the knocking phenomena. Thus, as seen in FIG. 3, in order to measure the cylinder pressures, a high temperature piezoresistive pressure transducer 20 is used. Such a transducer as indicated above is able to measure pressures in the cylinder even at the very high temperatures of the cylinder. Because the transducer 20 is able to operate at the high temperatures it does not have to be recessed in the cylinder wall, thereby allowing for capture of all the dynamic pressures in the cylinder making it able to capture the high frequency knocking effectively. The use of the acceleration compensated pressure transducer allows for the effective measurement of the knocking signal without picking up any noise from the vibrations of the engine due to other phenomena.

Again it is indicated that the device shown in U.S. Pat. No. 6,293,154 as fabricated with high temperature techniques as disclosed in the aforementioned patents represents the type of pressure transducer 20 employed in FIG. 3. The sensor which would be positioned in the knocking cylinder, would generate signals as shown in FIGS. 1B and 1C. While the signals could be used for analyzing a test engine for knocking phenomena in a laboratory, the signal is very difficult to analyze and is not suitable for immediate knocking control by a technician or by an automatic process.

In order to produce a signal that is easier to analyze, the present invention incorporates a high frequency amplifier 22 adapted to isolate the knocking signal both from extraneous noise as well as other engine pressures. The amplifier in conjunction with the band pass filter performs this function. It is noted that the band pass filter appears at the output of the amplifier but it is understood that a band pass filter can be incorporated within the amplifier as for example the use of an operational amplifier, or the band pass filter can be located before the amplifier. This amplifier must be of a suitably high frequency to capture all of the knocking phenomena (>100 kHz). Such amplifiers are well known and include many high frequency operation amplifiers. Band pass filters are well known to those skilled in the art and there are many different types of such filters. A band pass filter can be a complex circuit including active devices and inductors or a network of resistors and capacitors. Another type of band pass filter is a digital filter. Digital signal processors (DSPs) are available today which are able to convert an analog signal to digital and then filter it. Such a DSP inside a microprocessor would be able to digitally filter the signal in the same way as an analog band pass filter. Another type of filter is a software filter. In a software filter the entire analog signal would be converted to a digital signal by a high speed data acquisition system. The signal would then be able to be filtered using suitable software to remove both the high and low frequencies. All of these filters perform substantially the same job of removing the combustion signal as well as any high frequency noise. By adding such a filter in conjunction with the high frequency amplifier 22 it is possible to filter out both high frequency noise as well as the lower frequency normal combustion pressures.

The output signal in FIG. 3 which is applied to the input of a microprocessor 25 or other processing circuit is the signal shown in FIG. 2B. The amplitude of the peaks, shown in 2B are solely dependent on knocking and are not a function of the combustion pressure of the engine. Therefore, it is possible to measure this signal using the AC voltage setting on a normal multimeter to determine the degree of knocking in the engine. In a similar manner one can use a microprocessor 25 to measure the peaks and perform various types of analysis on the signal. Normally a measurement is highly dependent on the combustion pressures and would yield little information about knocking. Because filtering is performed electronically, an unanticipated advantage includes the ability to split the signal before filtering and therefore perform a more time intensive analysis on the full signal at a later time. Thus for example, one can take the signal on output line 21 and also direct this to the input of the microprocessor or data acquisition system for further analysis. This is shown by the dashed line connection from the output of the transducer 20 to an input of the microprocessor 25. The band pass filter 23 as indicated can either be of a fixed frequency band or can be a tunable filter. A fixed frequency band will allow for very good filtering on an engine with known conditions running at a known RPM. However, for multiple engine tests a tunable filter would allow the filter band pass to be adjusted so that different knock frequencies can be picked up at different RPMs. For example, at 2000 RPM the knock frequency might be 1000 Hz; whereas at 4000 RPM it might be 2000 Hz. In order to pick up the frequencies without interference from the regular combustion pressure it would be necessary to have a tunable band pass filter. Thus filter 23 as indicated can be a tunable filter which is tunable over a range between 500 Hz and 5000 Hz (or between 500 Hz and 3000 Hz, for example) depending on RPM. When tuning a band pass filter the 3 dB (decibal) points change. Hence, in one state the filter may be tuned to have a band pass between 1000 Hz and 2500 Hz. In another state, it may be between 750 Hz and 2000 Hz. Other frequency bands and ranges are also possible, depending on the application. Such filters are well known and can be constructed in many different ways. The tunable band pass filter 23 would also allow for pick up of other combustion phenomena such as dieseling. Dieseling occurs when the temperature inside the cylinder 15 is hot enough to cause premature ignition before the spark plug is fired. By tuning the filter correctly this phenomena can be picked up as well. For examples of suitable band pass filters, reference is made to the text entitled *Electronic Engineers Handbook* by Donald G. Fink, et al (Third Edition), 1989, Chapter 12 entitled *Filters and Attenuators*.

Thus, there is disclosed an apparatus and technique to measure knocking in high temperature cylinders associated with internal combustion engines. It will be apparent to one skilled in the art that alternate embodiments may be discerned, all of which are encompassed within the spirit and scope of the claims appended hereto.

What is claimed is:

1. Apparatus for measuring knocking in an internal combustion engine, comprising:
    a high temperature, acceleration compensated pressure transducer positioned within the cylinder of said engine and providing an output signal indicative of the combustion signal together with the knocking signal, said pressure transducer comprising two substantially identical deflecting regions, one of said deflecting regions being exposed to pressure in said cylinder while said second deflecting regions being sealed from said pressure, each of said deflecting regions generating a signal that is combined to represent said output signal;
    a tunable band-pass filter for filtering said output signal to provide a filtered signal indicative of only said knocking signal, said filter having a range between 500-5000 Hz centered about a frequency dependent upon the revolutions per minute (RPM) of said engine;
    means for processing said filtered signal and said output signal to provide a measurement of the extent of said knocking.

2. The apparatus according to claim 1 wherein said means for processing is selected from the group consisting of: a microprocessor, a digital signal processor and a multimeter.

3. The apparatus according to claim 1 wherein said pressure transducer is a dielectrically isolated piezoresistive high temperature, acceleration compensated pressure transducer.

4. The apparatus according to claim 1 wherein said pressure transducer includes a silicon wafer having piezoresistors located therein.

5. The apparatus according to claim 1 further including an amplifier having an input and an output, said input coupled to said transducer for receiving said transducer output signal to provide an amplified output signal at said output.

6. The apparatus according to claim 5 wherein said amplifier output is coupled to said filter to enable filtering of said amplified output signal.

7. A method for measuring knocking in an internal combustion engine comprising the steps of:
    placing a pressure transducer in the cylinder of said engine to provide an output signal indicative of cylinder pressure, said pressure transducer comprising two substantially identical deflecting regions, one of said deflecting regions being exposed to pressure in said cylinder while said second deflecting regions being sealed from said pressure, each of said deflecting regions generating a signal that is combined to produce said output signal,
    filtering said transducer output signal to provide a filtered signal indicative only of knocking, said filtering performed by a tunable bandpass filter centered about a frequency based on a number of revolutions per minute of said engine, and
    processing said filtered signal and said output signal to provide a measurement of said knocking.

8. The method according to claim 7 further including the step of amplifying said transducer output signal prior to said step of filtering.

9. The method according to claim 7 further including the step of amplifying said filter signal prior to said step of processing.

10. The method according to claim 7 wherein said step of placing includes placing a high temperature, acceleration compensated pressure transducer in said cylinder.

11. The method according to claim 10 wherein said high temperature acceleration compensated transducer includes a silicon wafer mounted on a glass pedestal, said wafer having silicon piezoresistors positioned thereon.

12. The method according to claim 7 wherein said tuning of said band pass filter between 500 Hz and 3000 Hz.

13. The method according to claim 7 wherein said step of processing includes applying said filtered signal to an AC meter to obtain an AC output indicative of the amplitude of said knocking signal.

14. The method according to claim 7 wherein said measurement is indicative of internal combustion engine dieseling.

* * * * *